(12) United States Patent
Hsu et al.

(10) Patent No.: US 10,170,149 B2
(45) Date of Patent: Jan. 1, 2019

(54) OPENING AND CLOSING DEVICE OF ROTATING CAGE TYPE JUKEBOX DISC TRAY

(71) Applicants: LITE-ON ELECTRONICS (GUANGZHOU) LIMITED, Guangzhou (CN); LITE-ON TECHNOLOGY CORPORATION, Taipei (TW)

(72) Inventors: Shih-Ming Hsu, Taipei (TW); Jung-Fang Chang, Taipei (TW); Cheng-Wen Huang, Taipei (TW); Ming-Chun Tsao, Taipei (TW)

(73) Assignees: LITE-ON ELECTRONICS (GUANGZHOU) LIMITED, Guangzhou (CN); LITE-ON TECHNOLOGY CORPORATION, Taipei (TW)

(*) Notice: Subject to any disclaimer, the term of this patent is extended or adjusted under 35 U.S.C. 154(b) by 0 days.

(21) Appl. No.: 15/865,427

(22) Filed: Jan. 9, 2018

(65) Prior Publication Data
US 2018/0261246 A1  Sep. 13, 2018

(30) Foreign Application Priority Data
Dec. 6, 2017 (CN) .......................... 2017 1 1275817

(51) Int. Cl.
*G11B 17/26* (2006.01)
*G11B 17/047* (2006.01)
(Continued)

(52) U.S. Cl.
CPC ........ *G11B 17/0476* (2013.01); *G11B 17/226* (2013.01); *G11B 17/26* (2013.01); *G11B 33/0466* (2013.01)

(58) Field of Classification Search
None
See application file for complete search history.

(56) References Cited

U.S. PATENT DOCUMENTS 5,107,475 A * 4/1992 Serita ................. G11B 17/0284
369/30.61
5,813,740 A * 9/1998 Chang ................ G11B 33/0477
312/223.2
(Continued)

FOREIGN PATENT DOCUMENTS

CN         201570266 U  *  9/2010
CN         105261377 A  *  1/2016
JP          07220365 A  *  8/1995

*Primary Examiner* — William J Klimowicz
(74) *Attorney, Agent, or Firm* — McClure, Qualey & Rodack, LLP (57) ABSTRACT

An opening and closing device of rotating cage type jukebox disc tray including a first disc tray carrying discs and an opening and closing mechanism of disc tray including a first linkage mechanism and a first driving device is provided. The first linkage mechanism includes a first linkage bar, a first sliding member and a second linkage bar. The second linkage bar is slidingly disposed on the first sliding member which is slidingly disposed on the first linkage bar. When an end portion of the second linkage bar is connected to a first ear portion on a lateral side of the first disc tray, the first driving device drives the first sliding member to slide on the first linkage bar, leading the second linkage bar to slide on the first sliding member and thereby leading the first disc tray to rotate around a first fixing post.

10 Claims, 7 Drawing Sheets

(51) Int. Cl.
*G11B 33/04* (2006.01)
*G11B 17/22* (2006.01)

(56) References Cited

U.S. PATENT DOCUMENTS 7,151,718 B2 * 12/2006 Schumacher .......... G11B 17/26
 369/30.33
2017/0287519 A1 * 10/2017 Luo ...................... G11B 17/226
2018/0261246 A1 * 9/2018 Hsu ..................... G11B 17/0476

* cited by examiner

OPENING AND CLOSING DEVICE OF ROTATING CAGE TYPE JUKEBOX DISC TRAY

This application claims the benefit of U.S. provisional application Ser. No. 62/468,396, filed Mar. 8, 2017 and People's Republic of China application Serial No. 201711275817.X, filed Dec. 6, 2017, the subject matters of which are incorporated herein by reference.

BACKGROUND

Technical Field

The present disclosure is related in general to an opening and closing device of rotating cage type jukebox disc tray, and more particularly to an opening and closing device of rotating cage type jukebox disc tray including an opening and closing mechanism of disc tray.

Description of the Related Art

Rotating cage type data storage and access devices are usually used for storing and accessing large amount of data. In current designs, a rotating cage type jukebox disc tray is usually equipped with disc trays which only rotate around single direction to be opened and closed and arranged corresponding to single stack of optical drives with only one mechanical gripper to pick and place discs. While only one disc tray is opened at one time, when storing and accessing large amount of data is performed, the arrangement of only one stack of optical drives for reading data results in failing to speed up the operation.

SUMMARY OF THE INVENTION

The present disclosure is directed to an opening and closing device of rotating cage type jukebox disc tray. With the design of the two-bar linkage mechanism of the opening and closing mechanism of disc tray, the discs can be easily picked and placed without requiring complex structures or complicated processes, thereby the opening and closing device of rotating cage type jukebox disc tray of the present disclosure is provided with advantages of simple structures and convenience of picking and placing discs.

According to an embodiment of the present disclosure, an opening and closing device of rotating cage type jukebox disc tray is provided. The opening and closing device of rotating cage type jukebox disc tray includes a first disc tray and an opening and closing mechanism of disc tray. An end of the first disc tray is installed on a first fixing post, the other end of the first disc tray carries a plurality of discs, and the first disc tray has a first ear portion on a lateral side. The opening and closing mechanism of disc tray includes a first linkage mechanism and a first driving device. The first linkage mechanism includes a first linkage bar, a first sliding member and a second linkage bar, the first sliding member is slidingly disposed on the first linkage bar, the second linkage bar is slidingly disposed on the first sliding member, and the first sliding member and the second linkage bar slide along different directions. When an end portion of the second linkage bar is connected to the first ear portion of the first disc tray, the first driving device drives the first sliding member to slide on the first linkage bar, leading the second linkage bar to slide on the first sliding member and thereby leading the first disc tray to rotate around the first fixing post.

The disclosure will become apparent from the following detailed description of the preferred but non-limiting embodiments. The following description is made with reference to the accompanying drawings.

DETAILED DESCRIPTION OF THE INVENTION

According to the embodiments of the present disclosure, an opening and closing device of rotating cage type jukebox disc tray is provided. The embodiments are described in details with reference to the accompanying drawings. The details of the embodiments are for exemplification only, not for limiting the scope of protection of the disclosure. Moreover, the identical or similar elements of the embodiments are designated with the same reference numerals. Also, it is also important to point out that the illustrations may not be necessarily be drawn to scale, and that there may be other embodiments of the present disclosure which are not specifically illustrated. Thus, the specification and the drawings are to be regarded as an illustrative sense rather than a restrictive sense. It is to be noted that the drawings are simplified for clearly describing the embodiments, and the details of the structures are for exemplification only, not for limiting the scope of protection of the disclosure. Ones having ordinary skills in the art may modify or change the structures according to the embodiments of the present disclosure.

Figure 1:
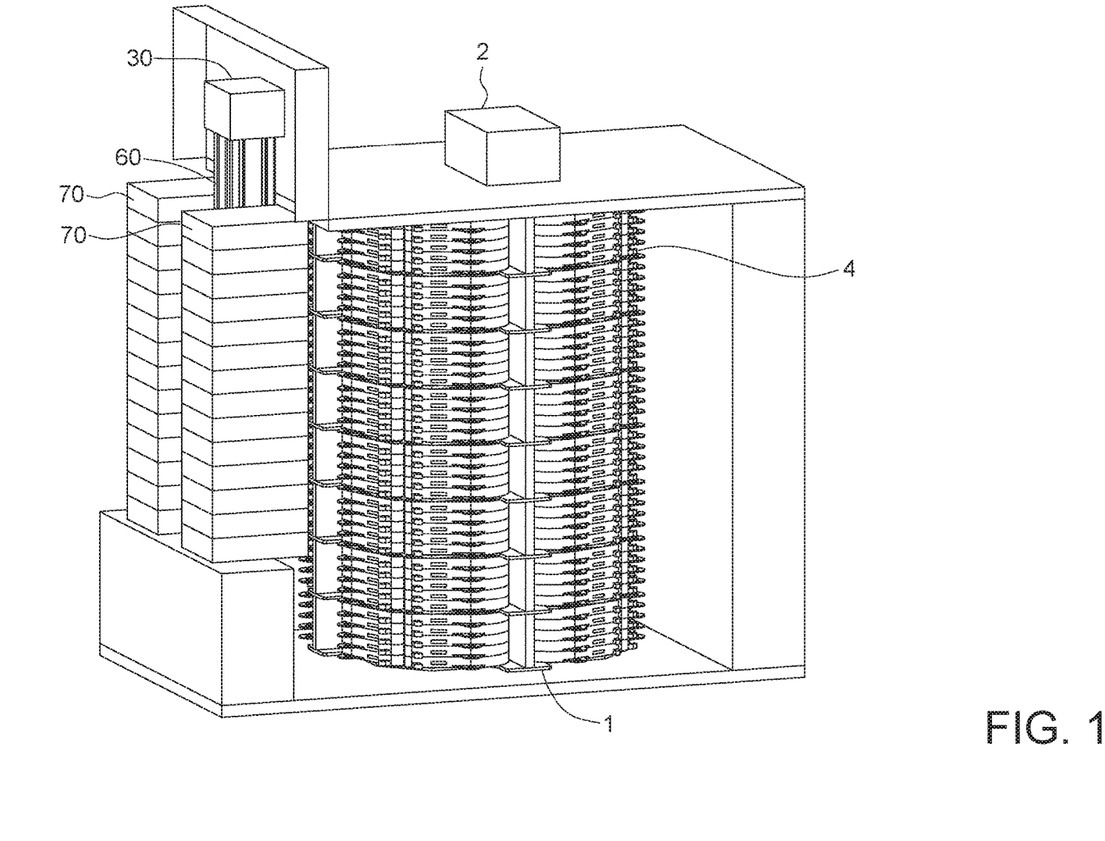
FIG. 1 shows a three-dimensional view of a rotating cage type jukebox disc tray according to an embodiment of the present disclosure.
Figure 2:
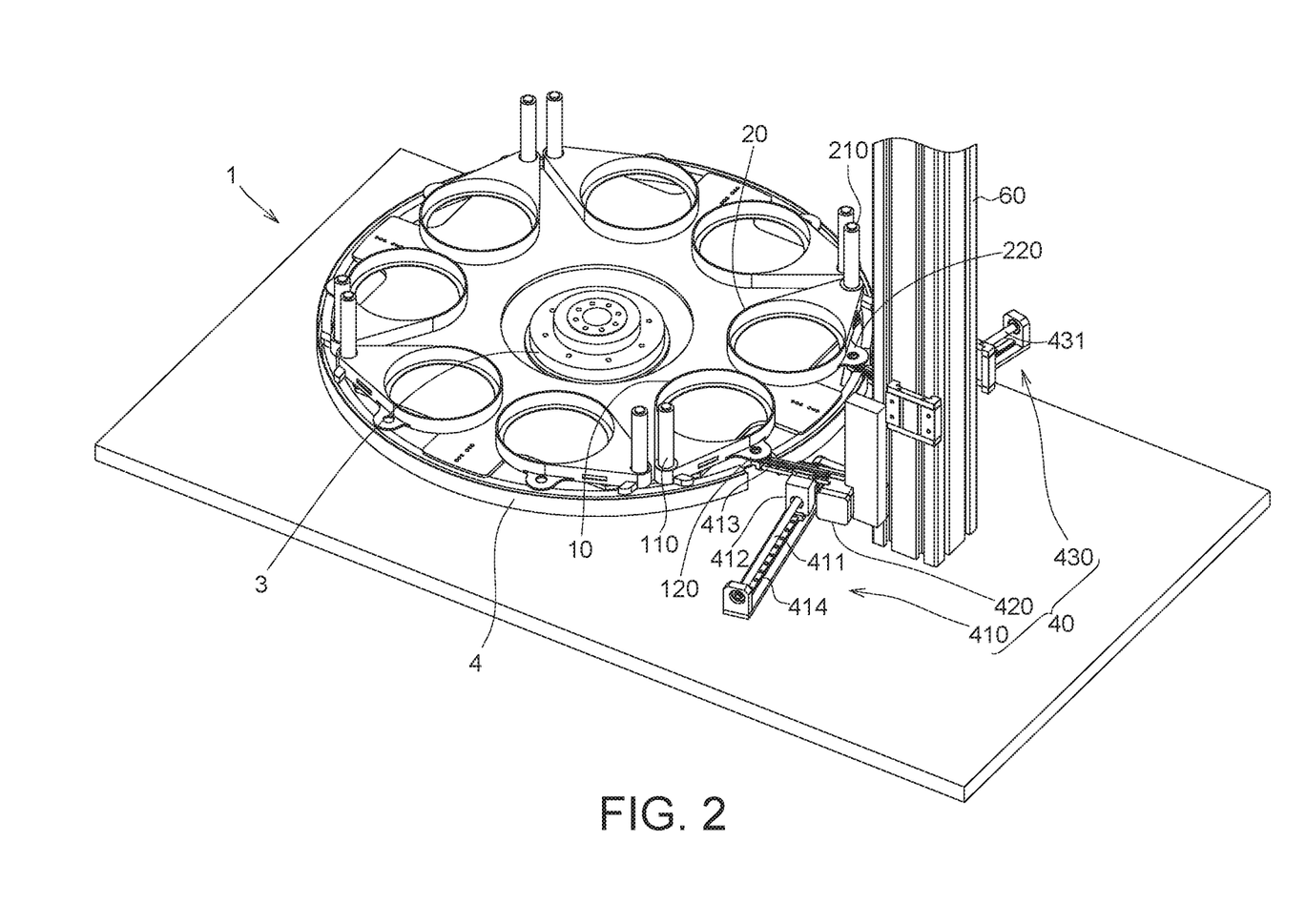
FIG. 2 shows a three-dimensional view of an opening and closing device of rotating cage type jukebox disc tray according to an embodiment of the present disclosure.
Figure 3:
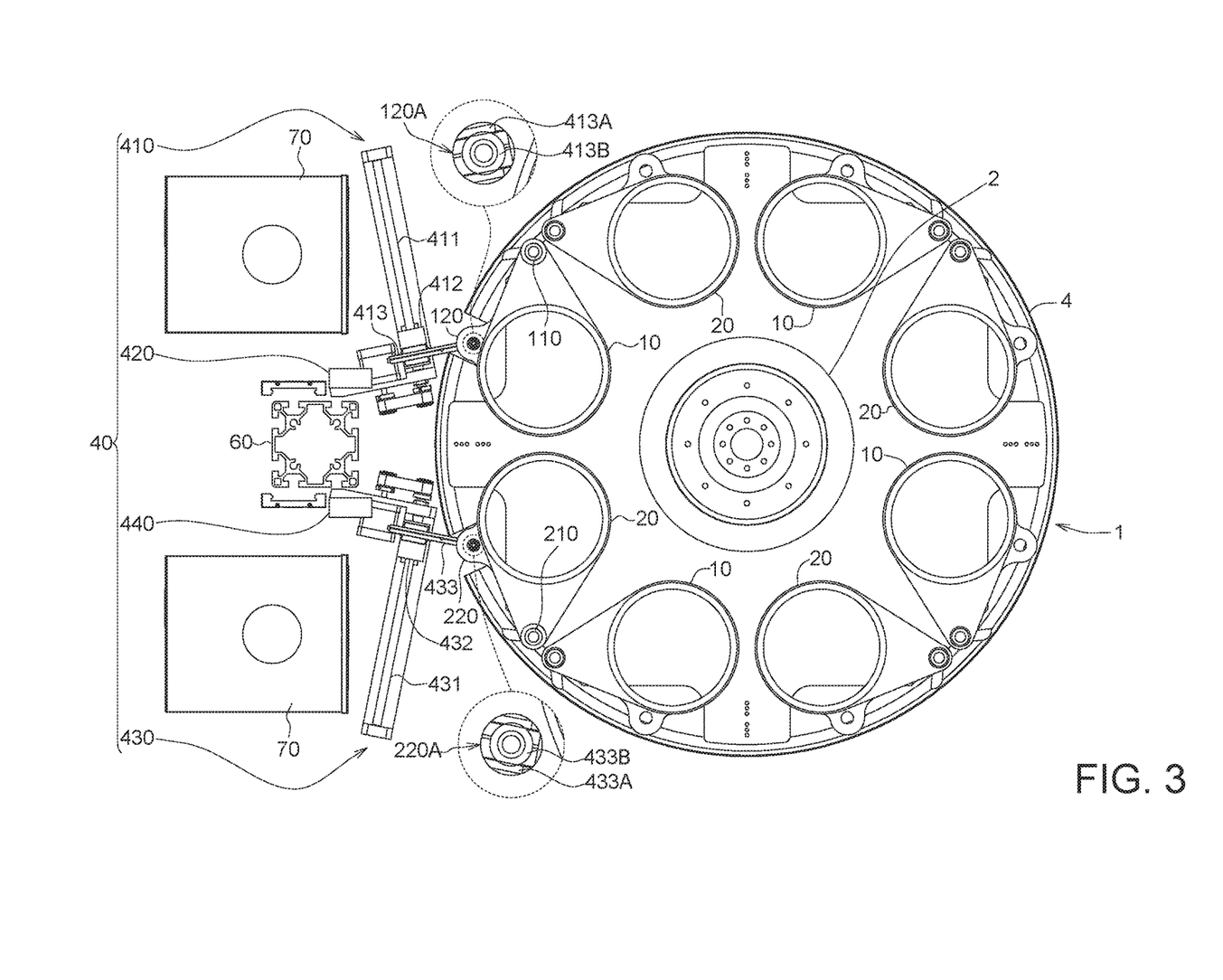
FIG. 3 shows a top view of an opening and closing device of rotating cage type jukebox disc tray according to an embodiment of the present disclosure.
Figure 4:
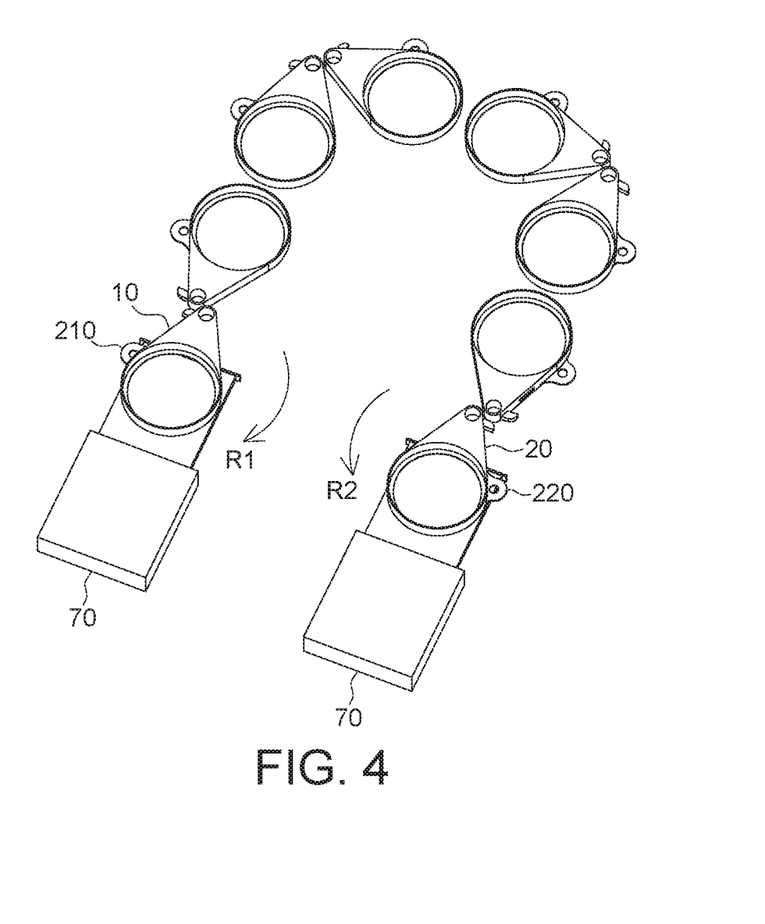
FIG. 4 shows a three-dimensional view of a rotating cage of disc jukebox, disc trays and optical drives according to an embodiment of the present disclosure.
Figure 5:
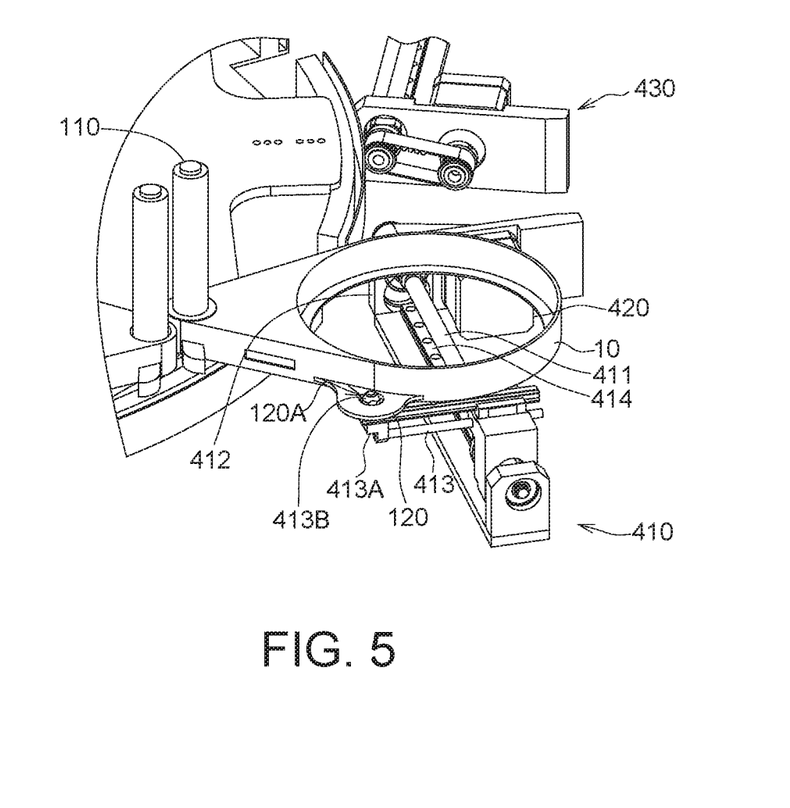
FIG. 5 shows a three-dimensional view of an opening and closing device of rotating cage type jukebox disc tray as viewed from another direction according to an embodiment of the present disclosure.

FIG. 1 shows a three-dimensional view of a rotating cage type jukebox disc tray according to an embodiment of the present disclosure, FIG. 2 shows a three-dimensional view of an opening and closing device of rotating cage type jukebox disc tray according to an embodiment of the present disclosure, FIG. 3 shows a top view of an opening and closing device of rotating cage type jukebox disc tray according to an embodiment of the present disclosure, FIG. 4 shows a three-dimensional view of a rotating cage of disc jukebox, disc trays and optical drives according to an embodiment of the present disclosure, and FIG. 5 shows a three-dimensional view of an opening and closing device of rotating cage type jukebox disc tray as viewed from another direction according to an embodiment of the present disclosure.

In the embodiments, the opening and closing device of rotating cage type jukebox disc tray includes a first disc tray 10, a mechanical gripper driving device 30, and an opening and closing mechanism of disc tray 40. An end of the first disc tray 10 is installed on a first fixing post 110 and the first fixing post 110 is disposed on a periphery of the rotating cage of disc jukebox 1. The other end of the first disc tray 10 carries a plurality of discs, and the first disc tray 10 has a first ear portion 120 on a lateral side. The opening and closing mechanism of disc tray 40 is disposed on the mechanical gripper driving device 30. The opening and closing mechanism of disc tray 40 includes a first linkage mechanism 410 and a first driving device 420. The first linkage mechanism 410 includes a first linkage bar 411, a first sliding member 412 and a second linkage bar 413. The first sliding member 412 is slidingly disposed on the first linkage bar 411 and the second linkage bar 413 is slidingly disposed on the first sliding member 412. The first sliding member 412 and the second linkage bar 413 slide along different directions, and an end portion 413A of the second linkage bar 413 can be connected to the first ea portion 120 of the first disc tray 10.

For example, as shown in FIG. 3, the first sliding member 412 slides back and forth along the extending direction of the first linkage bar 411, and the second linkage bar 413 slides back and forth along the extending direction of the second linkage bar 413.

In one embodiment, the first sliding member 412 and the second linkage bar 413 may have substantially perpendicular sliding directions.

In the embodiments, when the end portion 413A of the second linkage bar 413 is connected to the first ear portion 120 of the first disc tray 10, the first driving device 420 drives the first sliding member 412 to slide on the first linkage bar 411, leading the second linkage bar 413 to slide on the first sliding member 412 and thereby leading the first disc tray 10 to rotate around the first fixing post 110 toward the periphery of the rotating cage of disc jukebox 1.

According to the embodiments of the present disclosure, with the design of the two-bar linkage mechanism of the opening and closing mechanism of disc tray 40, the discs can be easily picked and placed without requiring complex structures or complicated processes, thereby the opening and closing device of rotating cage type jukebox disc tray of the present disclosure is provided with advantages of simple structures and convenience of picking and placing discs.

As shown in FIG. 3 and FIG. 5, in some embodiments, the end portion 413A of the second linkage bar 413 has a first flange 413E and the first ear portion 120 has a central hole 120A. The first flange 413E penetrates through the central hole 120A so that the second linkage bar 413 is connected to the first ear portion 120.

In some embodiments, the first linkage mechanism 410 may further include a first conveyor belt 414, and the first driving device 420 drives the first conveyor belt 414 to lead the first sliding member 412 to slide along the first linkage bar 411.

In some embodiments, the opening and closing mechanism of disc tray 40 may further include a second linkage mechanism 430. The second linkage mechanism 430 includes a third linkage bar 431, a second sliding member 432 and a fourth linkage bar 433. The second sliding member 432 is slidingly disposed on the third linkage bar 431, the fourth linkage bar 433 is slidingly disposed on the second sliding member 432, wherein the second sliding member 432 and the fourth linkage bar 433 slide along different directions.

In some embodiments, the opening and closing device of rotating cage type jukebox disc tray may further include a second disc tray 20. An end of the second disc tray 20 is installed on a second fixing post 210 and the second fixing post 210 is disposed on a periphery of the rotating cage of disc jukebox 1. The other end of the second disc tray 20 carries a plurality of discs. The second disc tray 20 has a second ear portion 220 on a lateral side, and an end portion 433A of the fourth linkage bar 433 can be connected to the second ear portion 220.

In some embodiments, the opening and closing mechanism of disc tray 40 may further include a second driving device 440. When the end portion 433A of the fourth linkage bar 433 is connected to the second ear portion 220 of the second disc tray 20, the second driving device 440 drives the second sliding member 432 to slide on the third linkage bar 431, leading the fourth linkage bar 433 to slide on the second sliding member 432 and thereby leading the second disc tray 20 to rotate around the second fixing post 210 toward the periphery of the rotating cage of disc jukebox 1.

In some embodiments, the end portion 433A of the fourth linkage bar 433 has a second flange 433B and the second ear portion 220 has a central hole 220A. The second flange 433B penetrates through the central hole 220A so that the fourth linkage bar 433 is connected to the second ear portion 220.

In some embodiments, the second linkage mechanism 430 may further include a second conveyer belt (not shown in drawings), and the second driving device 440 drives the second conveyer belt to lead the second sliding member 432 to slide along the third linkage bar 431.

In the embodiments, the opening and closing device of rotating cage type jukebox disc tray may further include two mechanical grippers and a guide rail 60. The mechanical gripper driving device 30 drives the two mechanical grippers to move along the guide rail 60 upwards and downwards. The two mechanical grippers are disposed corresponding to the first linkage mechanism 410 and the second linkage mechanism 430, respectively, such that the two mechanical grippers can pick and place the discs carried by the corresponding first disc tray 10 and the discs carried by the corresponding second disc tray 20 simultaneously.

In the embodiments, the arrangement of components of the first linkage mechanism 410 and the arrangement of components of the second linkage mechanism 430 are substantially mirror-symmetrical. Specifically speaking, as shown in FIG. 3, the relative arrangement of the first linkage bar 411, the first sliding member 412 and the second linkage bar 413 of the first linkage mechanism 410 and the relative arrangement of the third linkage bar 431, the second sliding member 432 and the fourth linkage bar 433 of the second linkage mechanism 430 are substantially mirror-symmetrical with to respect to the connecting line from the guide rail 60 to the rotating cage driving device 2. As described above, the two arrangements are substantially mirror-symmetrical; thereby the first disc tray 10 and the second disc tray 20 can be opened by proceeding towards opposite directions. As such, the first linkage mechanism 410 and the second linkage mechanism 430 can open two disc trays (e.g. the first disc tray 10 and the second disc tray 20) at the same time, and the two disc trays can rotate outwards around different directions to be opened, which is advantageous to the usage of limited space, and thus the additional required space outside the rotating cage of disc jukebox can be reduced to a maximum level.

In the embodiments, one of the first disc tray 10 and the second disc tray 20 rotates around a clockwise direction, and the other one of the first disc tray 10 and the second disc tray 20 rotates around a counterclockwise direction. As shown in FIG. 4, (the opening and closing mechanism of disc tray 40 is not shown in FIG. 4), the first disc tray 10 rotates around a clockwise direction R1, and the second disc tray 20 rotates around a counterclockwise R2, resulting in the open position as represented in FIG. 4.

As shown in FIG. 4, in the embodiments, the optical drives 70 are disposed on a side of the disc trays (e.g. the first disc tray 10 and the second disc tray 20). For example, the two stacks of optical drives 70 are correspondingly disposed on a side of the first disc tray 10 and a side of the second disc tray 20, respectively. Consequently, when the first linkage mechanism 410 and the second linkage mechanism 430 of the opening and closing mechanism of disc tray 40 move the first disc tray 10 and the second disc tray 20 respectively to the open position, the two stacks of optical drives 70 can perform reading and/or writing operations on the discs carried by the two disc trays at the same time, and thus the reading and/or writing speeds of discs can be increased. Compared to the design of a conventional rotating cage disc jukebox of which only one disc tray can be opened at one time with only one stack of optical drives for reading operations, the opening and closing device of rotating cage type jukebox disc tray of the present disclosure can achieve performing reading and/or writing operations on the discs carried by two disc trays by two stacks of optical drives 70 at the same time, such that the speed of data reading and/or writing can be doubled, and thus the product competitiveness can be greatly increased. In addition, the two stacks of optical drives 70 can perform different reading and/or writing operations, such that the data treatment flexibility is improved, and thus the various needs by more users are satisfied.

In the embodiments, as shown in FIGS. 1-3, the rotating cage of disc jukebox 1 is constructed by stacking multiple layers 4 of disc trays. The rotating cage driving device 2 drives the rotating cage of disc jukebox 1 to rotate around the rotating cage axis 3 as the central axis.

In some embodiments, referring to FIG. 1 and FIG. 3, the rotating cage of disc jukebox 1 includes forty (8×5) layers 4 of disc trays with each layer 4 including four pairs of the first disc tray 10 and the second disc tray 20, i.e. eight disc trays in total; as such, the rotating cage of disc jukebox 1 can accommodate 320 (8×5×8) disc trays, and a stack of optical drives 70 includes twelve optical drives 70. However, the above number of disc trays and the number of the layers of disc trays are for exemplification only, not for limiting the scope of protection of the disclosure.

For example, discs with an access speed of 4.5 MB/s are taken as an example, when the design of a conventional rotating cage disc jukebox of which only one disc tray can be opened at one time with only one stack of optical drives for reading operations is applied, the maximum access speed of the conventional design is 648 MB/s (4.5×12×12). On the contrary, when the design of the present disclosure which allows two stacks of optical drives 70 (i.e. twenty-four optical drives 70) to perform reading and/or writing operations at the same time is applied, the maximum access speed of the design of the present disclosure is 1296 MB/s (4.5× 12×24), which is double of the maximum access speed of the conventional design.

Figure 6:
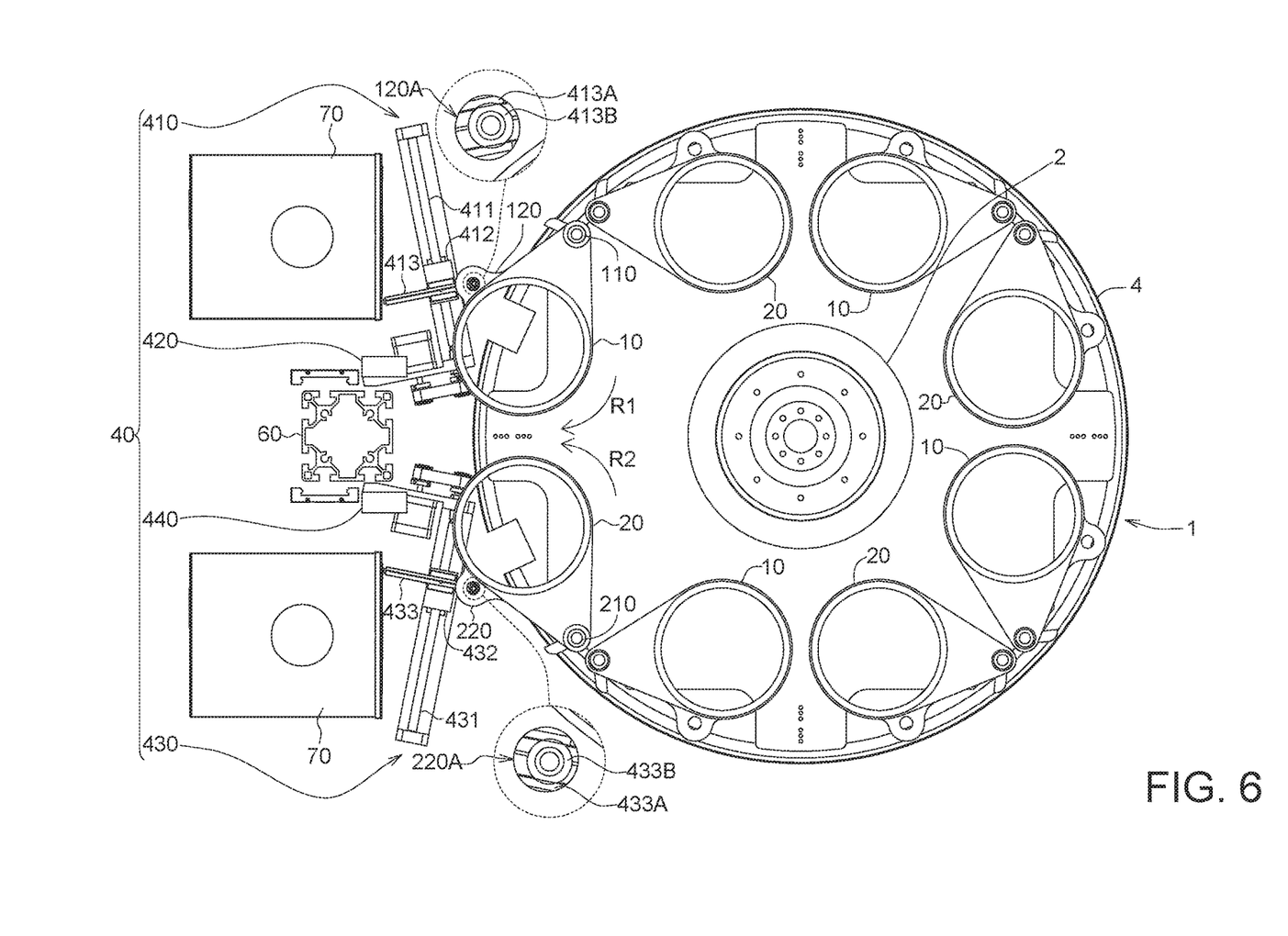
FIGS. 6-7 show top views of an opening and closing process of an opening and closing device of rotating cage type jukebox disc tray according to an embodiment of the present disclosure.
Figure 7:
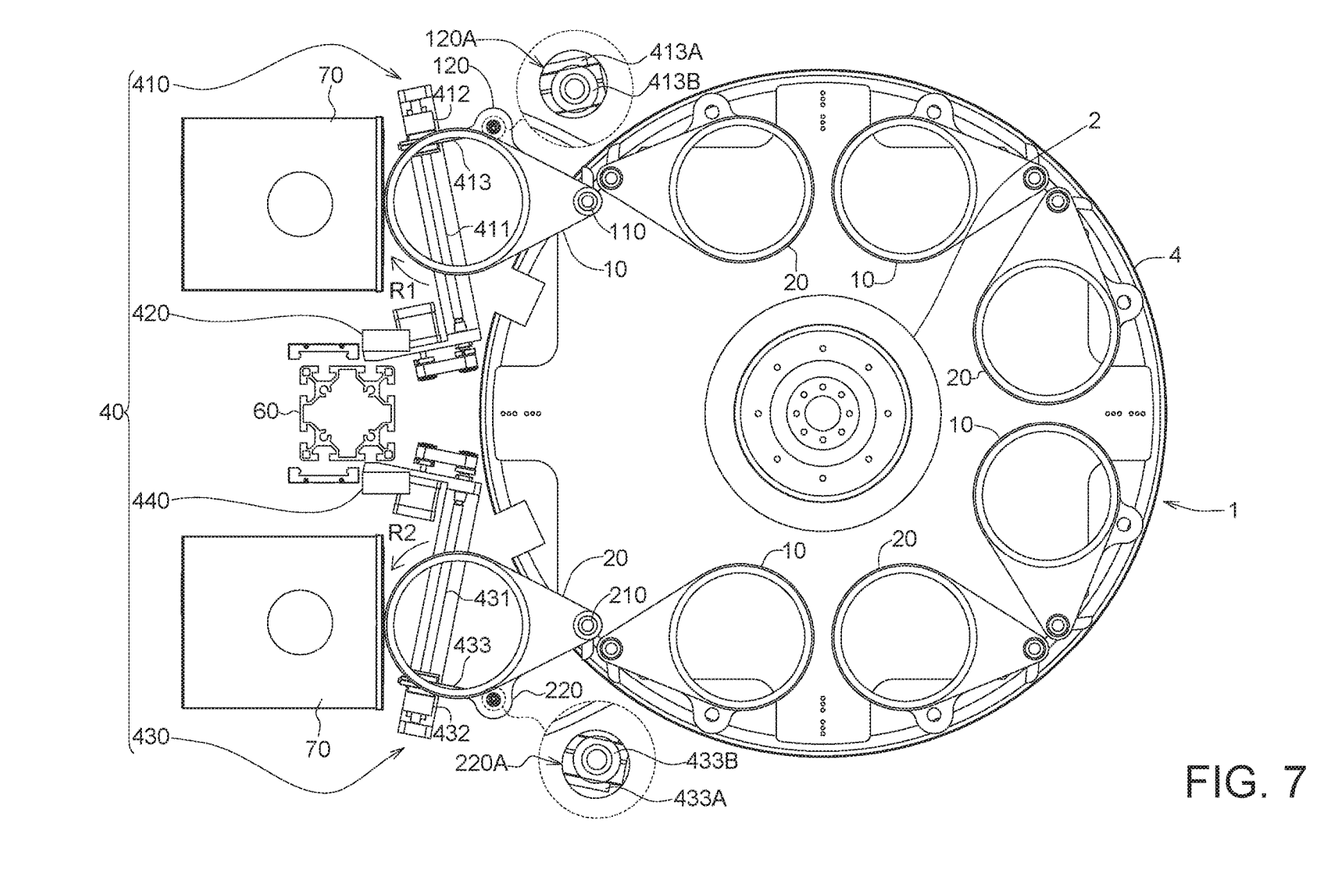

FIGS. 6-7 show top views of an opening and closing process of an opening and closing device of rotating cage type jukebox disc tray according to an embodiment of the present disclosure. Please refer to FIGS. 3 and 6-7.

As shown in FIG. 3, the first disc tray 10 and the second disc tray 20 are both located at the initial close position, and the first linkage mechanism 410 and the second linkage mechanism 430 have both moved to the layer of disc tray where the target discs are located. The first flange 413E penetrates through the central hole 120A, such that the end portion 413A of the second linkage bar 413 is connected to the first ear portion 120 of the first disc tray 10; the second flange 433B penetrates through the central hole 220A, such that the end portion 433A of the fourth linkage bar 433 is connected to the second ear portion 220.

Next, please refer to FIG. 6. The first driving device 420 drives the first sliding member 412 to slide on the first linkage bar 411, leading the second linkage bar 413 to slide on the first sliding member 412 and thereby leading the first disc tray 10 to rotate around the first fixing post 110 toward the periphery of the rotating cage of disc jukebox 1. At the same time, the second driving device 440 drives the second sliding member 432 to slide on the third linkage bar 431, leading the fourth linkage bar 433 to slide on the second sliding member 432 and thereby leading the second disc tray 20 to rotate around the second fixing post 210 toward the periphery of the rotating cage of disc jukebox 1. The first disc tray 10 rotates around the clockwise direction R1, and the second disc tray 20 rotates around the counterclockwise direction R2.

Next, please refer to FIG. 7. The first disc tray 10 is driven to rotate around the clockwise direction R1 to the open position, and the second disc tray 20 is driven to rotate around the counterclockwise direction R2 to the open position. Meanwhile, the mechanical gripper driving device 30 can drive the two mechanical grippers to move along the guide rail 60 to pick the discs from the first disc tray 10 and the second disc tray 20 respectively, and then following reading and/or writing operations are performed. The process for placing the discs is similar to the above-mentioned process, and the difference is that after the mechanical grippers put the discs back in the first disc tray 10 and the second disc tray 20 respectively, the first disc tray 10 and the second disc tray 20 move from the open position back to the initial close position according to the processes as indicated in FIGS. 7, 6 and 3 as well as following the proceeding sequential order from the steps of FIG. 7, FIG. 6 to FIG. 3.

According to the above embodiments, the opening and closing device of rotating cage type jukebox disc tray of the present disclosure can achieve performing reading and/or writing operations on the discs carried by two disc trays by two stacks of optical drives 70 at the same time, such that the speed of data reading and/or writing can be doubled, and thus the product competitiveness can be greatly increased.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An opening and closing device of rotating cage type jukebox disc tray, comprising:
   a first disc tray, wherein an end of the first disc tray is installed on a first fixing post, the other end of the first disc tray carries a plurality of discs, and the first disc tray has a first ear portion on a lateral side; and
   an opening and closing mechanism of disc tray, comprising a first linkage mechanism and a first driving device, wherein the first linkage mechanism comprises a first linkage bar, a first sliding member and a second linkage bar, the first sliding member is slidingly disposed on the first linkage bar, the second linkage bar is slidingly disposed on the first sliding member, and the first sliding member and the second linkage bar slide along different directions;

wherein when an end portion of the second linkage bar is connected to the first ear portion of the first disc tray, the first driving device drives the first sliding member to slide on the first linkage bar, leading the second linkage bar to slide on the first sliding member and thereby leading the first disc tray to rotate around the first fixing post.

2. The opening and closing device of rotating cage type jukebox disc tray according to claim 1, wherein the end portion of the second linkage bar has a first flange, the first ear portion has a central hole, and the first flange penetrates through the central hole so that the second linkage bar is connected to the first ear portion.

3. The opening and closing device of rotating cage type jukebox disc tray according to claim 1, wherein the opening and closing mechanism of disc tray further comprises a second linkage mechanism, the second linkage mechanism comprises a third linkage bar, a second sliding member and a fourth linkage bar, the second sliding member is slidingly disposed on the third linkage bar, the fourth linkage bar is slidingly disposed on the second sliding member, and the second sliding member and the fourth linkage bar slide along different directions.

4. The opening and closing device of rotating cage type jukebox disc tray according to claim 3, further comprising:
 a second disc tray, wherein an end of the second disc tray is installed on a second fixing post, the other end of the second disc tray carries a plurality of discs, the second disc tray has a second ear portion on a lateral side, and an end portion of the fourth linkage bar is connected to the second ear portion.

5. The opening and closing device of rotating cage type jukebox disc tray according to claim 4, wherein the opening and closing mechanism of disc tray further comprises a second driving device, when the end portion of the fourth linkage bar is connected to the second ear portion of the second disc tray, the second driving device drives the second sliding member to slide on the third linkage bar, leading the fourth linkage bar to slide on the second sliding member and thereby leading the second disc tray to rotate around the second fixing post.

6. The opening and closing device of rotating cage type jukebox disc tray according to claim 5, wherein the end portion of the fourth linkage bar has a second flange, the second ear portion has a central hole, and the second flange penetrates through the central hole so that the fourth linkage bar is connected to the second ear portion.

7. The opening and closing device of rotating cage type jukebox disc tray according to claim 5, wherein one of the first disc tray and the second disc tray rotates around a clockwise direction, and the other one of the first disc tray and the second disc tray rotates around a counterclockwise direction.

8. The opening and closing device of rotating cage type jukebox disc tray according to claim 1, further comprising:
 a mechanical gripper driving device, a mechanical gripper and a guide rail, the mechanical gripper driving device drives the mechanical gripper to move along the guide rail, and the opening and closing mechanism of disc tray is disposed on the mechanical gripper driving device.

9. The opening and closing device of rotating cage type jukebox disc tray according to claim 1, wherein the first sliding member and the second linkage bar have substantially perpendicular sliding directions.

10. The opening and closing device of rotating cage type jukebox disc tray according to claim 1, wherein the first linkage mechanism further comprises a first conveyor belt, and the first driving device drives the first conveyor belt to lead the first sliding member to slide along the first linkage bar.

* * * * *